United States Patent [19]
Han

[11] Patent Number: 5,872,925
[45] Date of Patent: Feb. 16, 1999

[54] BLOCKING A "REPLY TO ALL" OPTION IN AN ELECTRONIC MAIL SYSTEM

[75] Inventor: Charles S. Han, San Diego, Calif.

[73] Assignee: NCR Corporation, Dayton, Ohio

[21] Appl. No.: 635,427

[22] Filed: Apr. 18, 1996

[51] Int. Cl.⁶ .................................................. G06F 17/00
[52] U.S. Cl. ........................................................ 395/200.36
[58] Field of Search .............................. 395/200.36, 333, 395/335; 380/25, 30, 45

[56] References Cited

U.S. PATENT DOCUMENTS

| | | | |
|---|---|---|---|
| 4,458,109 | 7/1984 | Mueller-Schlloer | 380/30 |
| 5,040,141 | 8/1991 | Yazima et al. | 395/200.36 |
| 5,125,075 | 6/1992 | Goodale et al. | 395/200.36 |
| 5,276,689 | 1/1994 | Forrest et al. | 395/200.36 |

*Primary Examiner*—Ellis B. Ramirez
*Attorney, Agent, or Firm*—Merchant, Gould, Smith, Edell, Welter & Schmidt

[57] ABSTRACT

A "Reply to All" command may be selectively blocked by a sender in an electronic mail system. The "Reply to All" command may be disabled in response to selection and enablement of a "Block Reply to All" option when the message is composed by the sender. After the sender transmits the message, the message is displayed in a window on a computer operated by a receiver. If the "Block Reply to All" option has been enabled, then the "Reply to All" command is disabled at the computer operated by the receiver. The disabling of the "Reply to All" command may be visually represented by a change in the display.

24 Claims, 6 Drawing Sheets

BLOCKING A "REPLY TO ALL" OPTION IN AN ELECTRONIC MAIL SYSTEM

BACKGROUND OF THE INVENTION

1. Field of the Invention

This invention relates in general to a method, apparatus and article of manufacture for controlling an electronic mail system, and more particularly, to a method, apparatus and article of manufacture for blocking a "Reply To All" command for received messages in an electronic mail system.

2. Description of Related Art

We are truly in an information age. Now more than ever, moving enormous amounts of information rapidly across great distances is one of our most pressing requirements. From the largest of corporations to small one-person or family-owned entrepreneurial efforts, more professional people are discovering that the only way to be successful in the nineties is to realize that technology is continuously advancing and that they must somehow keep up.

Likewise, researchers from all corners of the earth are finding that their work thrives in a networked environment. Immediate access to the work of colleagues and a "virtual" library of millions of volumes and thousands of papers affords them the ability to incorporate a body of knowledge heretofore unthinkable. Work groups can now conduct interactive conferences with each other, paying no heed to physical location. The possibilities are endless.

Currently we have at our fingertips the ability to talk in "real-time" with someone in Japan, send a sizable contract to a group of people who will critique it, see if a computer sitting in a lab in some remote location is turned on, and find out if someone happens to be sitting in front of their computer in Europe, all inside of thirty minutes. No airline could ever match that travel itinerary.

The desire to communicate is the essence of networking. People have always wanted to correspond with each other in the fastest way possible, short of normal conversation. In computer networking, electronic mail is the most prevalent application of this. Electronic mail allows people to write back and forth, and send documents without having to spend much time worrying about how the message actually gets delivered.

People that share common interests are inclined to discuss their hobby or interest at every available opportunity. One modern way to aid in this exchange of information is by using a mailing list. Since electronic mail is hinged around the concept of an address, a mailing list identifier representing and comprised of electronic mail addresses is a natural evolution of electronic mail usage. Any information routed to the mailing list identifier is redistributed and sent to out to the electronic mail addresses associated with the mailing list identifier. The actual electronic mail addresses associated with the identifier may be added to or deleted from as needs arise. Thus, any mail sent to the mailing list identifier will "explode" out to each person named in the file maintained on a computer. Each person on the mailing list may then reply to the electronic mail message.

A recipient of an electronic mail message often may reply to the message by selecting among options display on a menu. A new message window may be displayed and the reply is automatically addressed to the sender. Thus, the recipient of a message may select to send a reply only to the sender of the message. However, it is often possible for the recipient to also send a reply to all members addressed by the original message. If the recipient chooses to send the reply to the sender and the other addressees, the reply may be automatically routed to the sender of the original message and to everyone who received it. This "Reply To All" command or option is therefore useful for carrying on group discussions electronically. If the sender does not want the recipient to send a reply to the sender and the other recipients, the sender must place specific instructions in the body of the message.

Some electronic mail programs allows the "Reply To All" option to be set as the default. This often results in an barrage of inadvertent mailings and can become a nuisance. Thus, caution must be used when replying to a message sent to a group mailing list.

It can be seen then that there is a need for a method, apparatus and article of manufacture that blocks a "Reply To All" option with an electronic mail system.

SUMMARY OF THE INVENTION

To overcome the limitations in the prior art described above, and to overcome other limitations that will become apparent upon reading and understanding the present specification, the present invention discloses a block to a "Reply To All" command or option in an electronic mail system. A system in accordance with the principles of the present invention includes an electronic mail system for routing information between a sender and at least one recipient. The sender may select a "Block Reply to All" option in a mail option window to prevent a recipient from sending a reply to a message received from a sender to an address other than the sender's. A received message window is displayed on a monitor immediate to a recipient. The received message window comprises a command menu including a "Reply to Sender" command and a "Reply to All" command. The "Reply to All" command is disabled in response to selection of the "Block Reply to All" option.

One aspect of the present invention is that a return reply option may be provided for notifying the sender that the electronic mail message was received. Another aspect of the present invention is that a save option may be provided for saving a copy of the electronic mail message in a outgoing mail archive. Another aspect of the present invention is that help functions and priority selections may be provided in the reply option window. Yet another aspect of the present invention is that the received mail window is displayed at a monitor immediate to a recipient, and the "Reply to All" command may be disabled in response to selection of the "Block Reply to All" option. Still another aspect of the present invention is that the disabling of the "Reply to All" command may be visually represented by a change in the display for the "Reply to All" command. Another aspect of the present invention is that the "Reply to All" command in the received mail window may be shaded differently from the remaining commands in the menu command line.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of the method, apparatus and article of manufacture in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
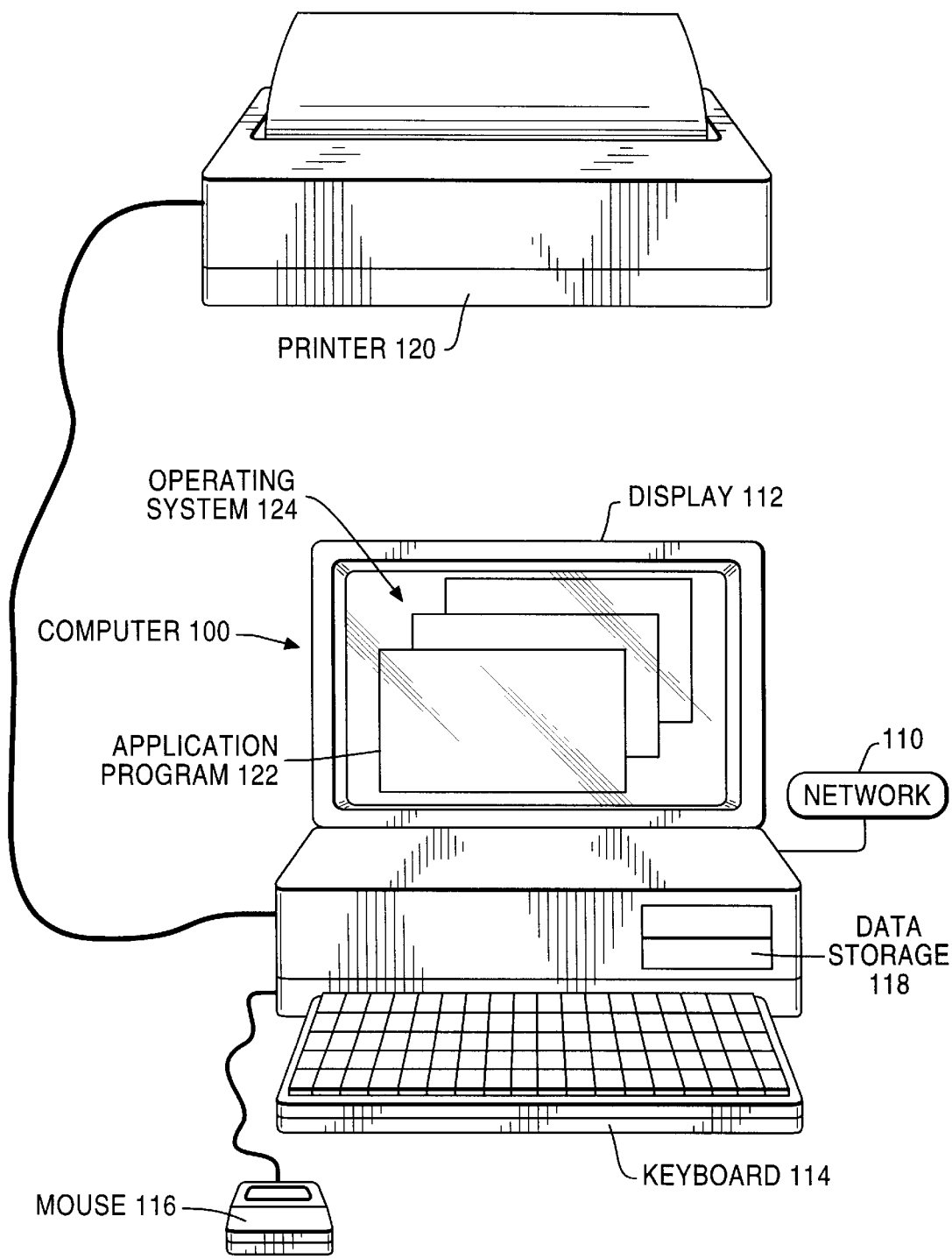
FIG. 1 is a block diagram illustrating an exemplary computer system used to implement an embodiment of the invention.

FIG. 1 is a block diagram illustrating an exemplary hardware environment of the present invention. The invention is typically implemented using a personal computer system 100. To facilitate the transmission of electronic messages between senders and recipients, the computer may be connected to other computer systems or terminals via a network 110 such as a local area network (LAN), a dial-up network, or the Internet. The computer 100 may include, inter alia, a monitor or display device 112, keyboard 114, mouse or other pointing device 116, fixed 118 and/or removable program storage devices 119, and printer 120. Those skilled in the art will recognize that any number of components, peripherals, and other devices may be used with the computer system 100.

An electronic mail system computer program 122 executing under the control of an operating system 124, such as "IBM OS/2™", "MICROSOFT WINDOWS™", "UNIX™", "DOS™", etc., is used to implement the present invention on the computer 100. Generally, the electronic mail system computer program 122 is tangibly embodied in a computer-readable medium, e.g., one or more of the fixed 118 and/or removable program storage devices 119. The electronic mail system computer program 122 comprises instructions which, when read and executed by the computer 100, causes the computer 100 to perform the steps necessary to implement the present invention. Under control of the operating system 124, the electronic mail system computer program 122 may be loaded from the program storage device (118 or 119) into the memory of the computer 100 for use during actual operations.

Those skilled in the art will recognize that the exemplary environment illustrated in FIG. 1 is not intended to limit the present invention. Indeed, those skilled in the art will recognize that other alternative hardware environments may be used without departing from the scope of the invention.

Figure 2:
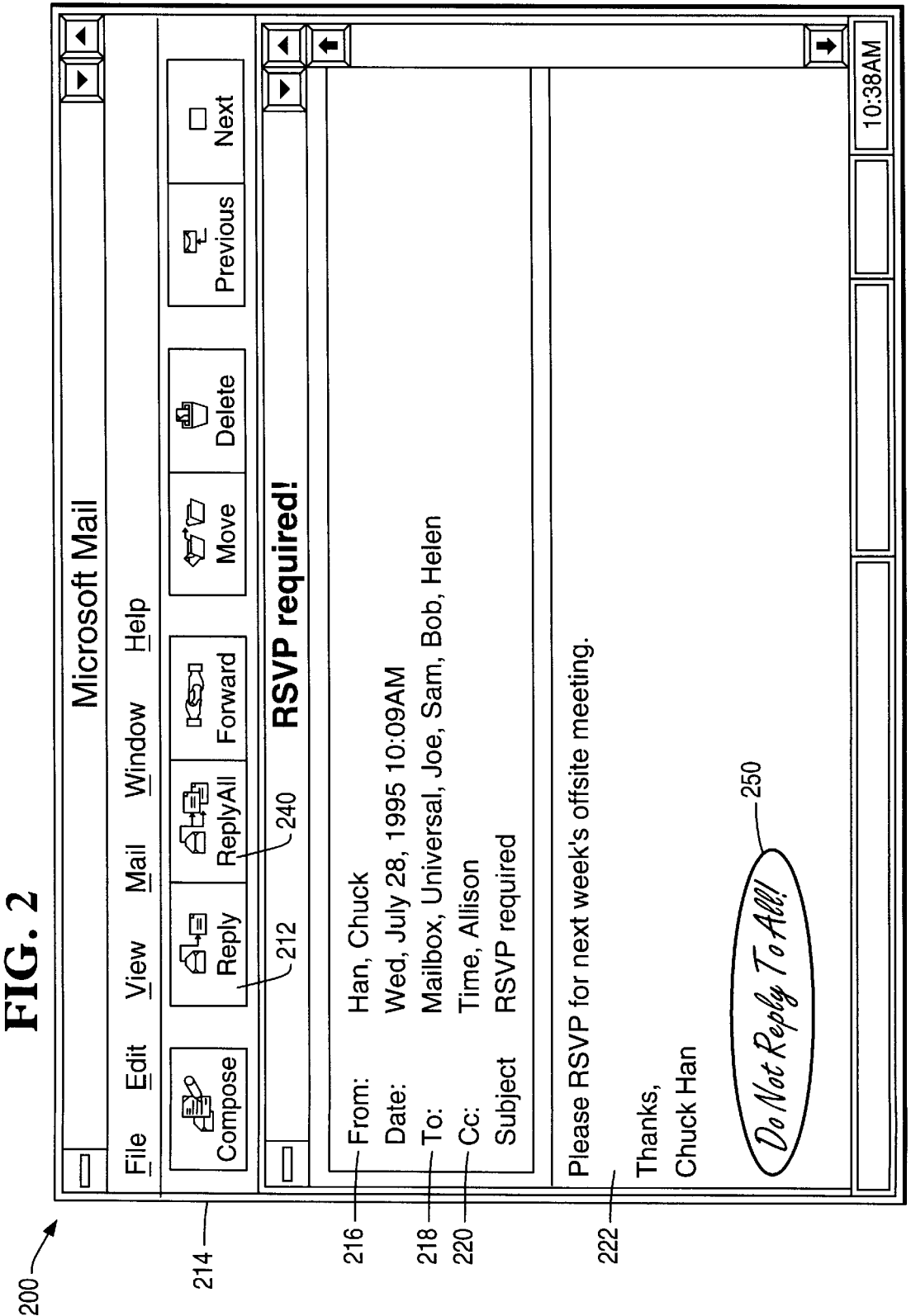
FIG. 2 is a block diagram illustrating a message window displayed by an exemplary electronic mail (e-mail) system.

FIG. 2 is a block diagram illustrating a message window displayed by an exemplary electronic mail (e-mail) system. The message window displays a received message 200 from the electronic mail system. For illustration purposes only, the message window is a MICROSOFT MAIL® message window. However, those skilled in the art will recognize that the examples are not meant to limit the invention to a particular electronic mail system, but that the invention is applicable to any electronic mail system which includes the "Reply to All" functionality.

To reply to a current message 210, a recipient typically selects Reply 212 from a Message menu 214. A new message window is displayed (not shown). The original sender's address 216 is automatically placed in a "To:" field 218 of the header, as illustrated in the current message 210, along with the recipient's address. Secondary recipients names or electronic mail addresses 220 are included in a "Cc" field 220, as illustrated in the current message 210. The original sender's text 222 may also automatically be included in the message body of the reply message. This text may be edited as needed before the reply is sent. Further, additional text can be added to the reply just as to any outgoing message, and the reply can then be sent or saved for further changes.

Several variations for the Reply command exist in prior art electronic mail systems. The recipient of a message may elect to send a reply only the sender of the message 216, or the recipient may elect to send a reply to all members 240 on the mailing list. When the recipient chooses to reply only to the sender 216, the recipient prepares the reply, selects a Reply function, and the reply message is sent only to the sender 216. However, if the recipient selects a "Reply To All" command 240, then the reply is routed to the sender 216 of the original message 10 and to everyone who received it 218, 220. The "Reply to All" command is useful for carrying on group discussions electronically. However, in the prior art, if the sender does not want the recipient to send a reply to the sender and the other recipients, the sender must place specific instructions 250 in the body 222 of the message 210.

Some electronic mail systems allow the "Reply to All" option 240 to be set as the default. As mentioned above, this often results in an barrage of inadvertent mailings and can become a nuisance. Thus, caution must be used when replying to a message sent to a group mailing list. If a recipient on a mailing list wishes to respond to the author only, then proper care must be exercised to make sure that the only address replied to is that person, and not the entire list. Usually the content of mail dictates the options the recipient performs, but the burden is on the sender to remind the user not to choose "Reply to All" command and each member must exercise their responsibility in not choosing the "Reply to All" option 240.

Figure 3:
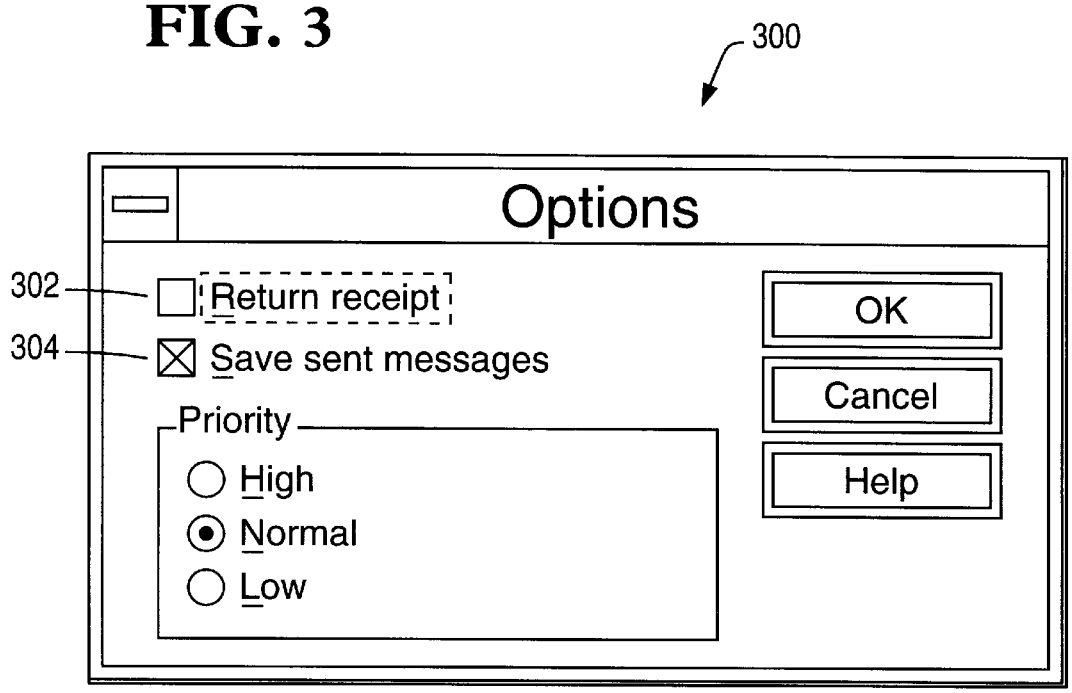
FIG. 3 is a block diagram illustrating an option window displayed by an exemplary electronic mail (e-mail) system.

FIG. 3 is a block diagram illustrating an option window 300 displayed by the exemplary electronic mail system. The option window 300 is displayed when the sender instructs the electronic mail system to send a message. The sender may choose to be notified that the recipient received the mail 302. Further, the sender may choose to save 304 the outgoing messages in his out box. Still further, the sender may set the priority 306 for the message being sent.

Figure 4:
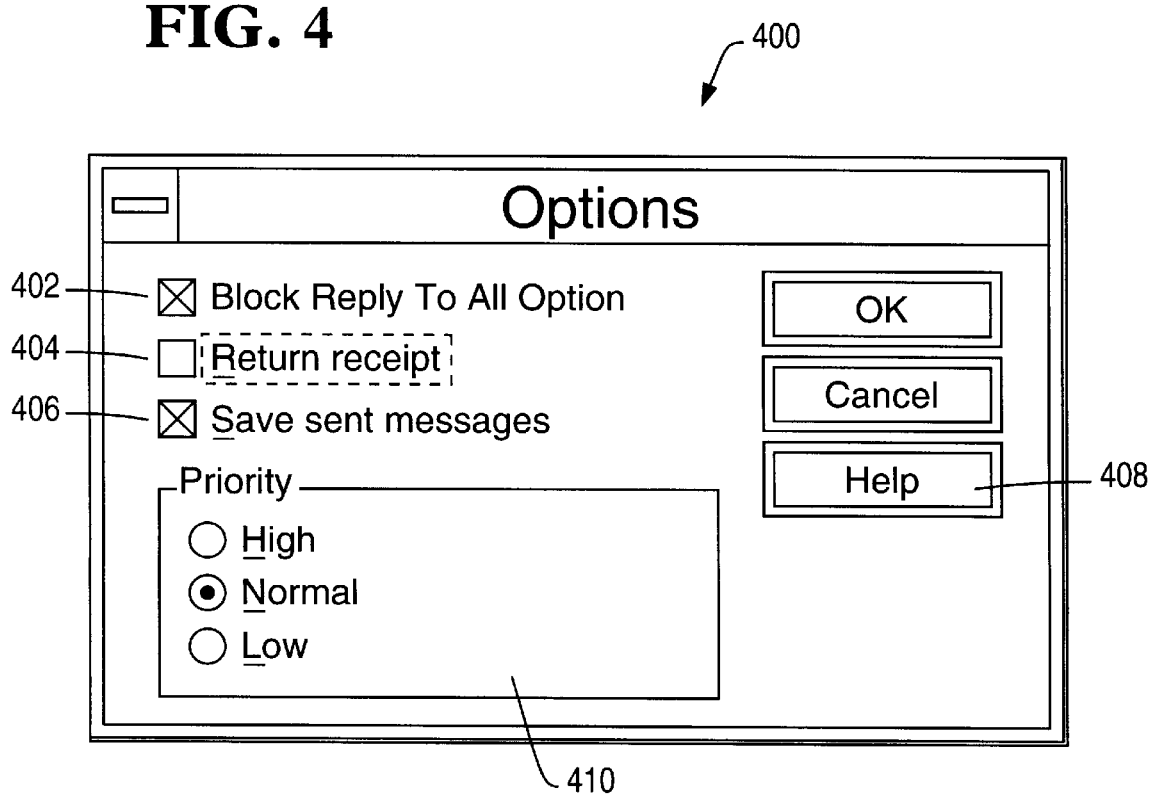
FIG. 4 is a block diagram illustrating an option window displayed by an exemplary electronic mail (e-mail) system, wherein the option window allows for the blocking of "Reply to All" functions.

FIG. 4 is a block diagram illustrating an option window 400 displayed by the exemplary electronic mail system, wherein the option window allows for the blocking of "Reply to All" functions. The option window 400 according to the present invention may be similar to the option window 100 illustrated in FIG. 3. According to the present invention, the option window 400 includes functionality that allows a sender to block the execution of "Reply to All" commands by recipients. In the present embodiment, the "Block Reply to All" box 402 is selected by the user to invoke the blocking function. However, those skilled in the art will recognize that the invention is not meant to be limited by this example by that other ways of invoking the "Block Reply to All" functionality may be used without departing from the teaching of the present invention.

The option window 400 may include a box that is selected to request that the sender be notified upon delivery of the message 404. The option window may also include a box that is selected to save the outgoing message in the sender's outgoing mailbox for archival storage 406. Further, the option window may include help functions 408 and priority selections 410.

Figure 5:
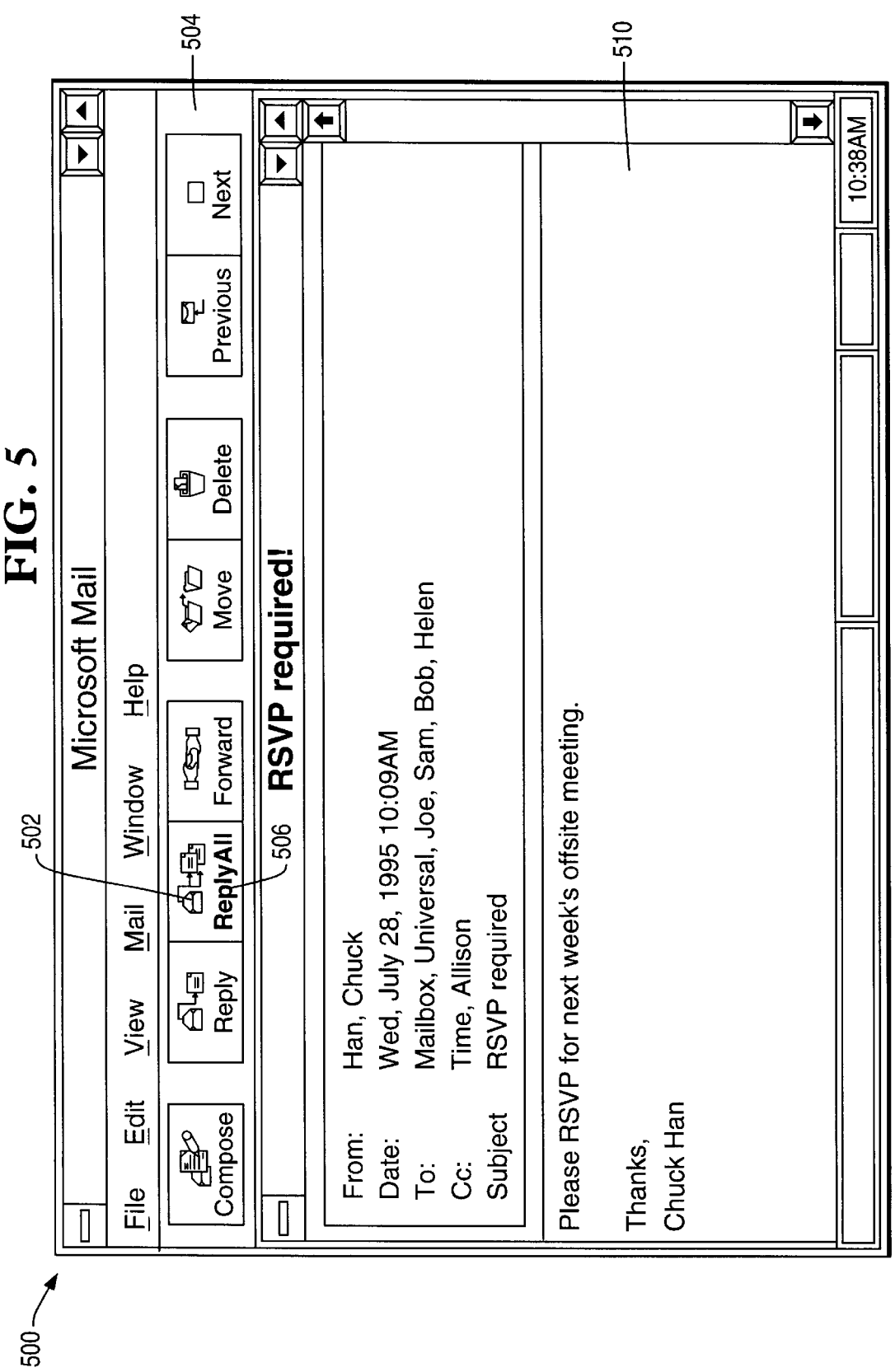
FIG. 5 is a block diagram illustrating a message window displayed by an exemplary electronic mail (e-mail) system, wherein the "Reply to All" functions have been blocked by the sender.

FIG. 5 is a block diagram illustrating a message window 500 displayed by the exemplary electronic mail system, wherein the "Reply to All" functions have been blocked by the sender. Although the "Reply to All" command button 502 in the menu command line 504 is still present, the functionality for the "Reply to All" command 502 has been blocked. The change in the availability of the "Reply to All" command 502 is represented by a change in the display for the "Reply to All" command button 502. In the present example, the "Reply to All" command button 502 has been shaded darker 506 than the remaining command buttons in the menu command line 504. Thus, the unavailability of the "Reply to All" command button 502 is immediately evident to the recipient. Accordingly, there is no need to include instructions in the body of the text 510 to encourage the recipients not to choose the "Reply to All" command 502.

Figure 6:
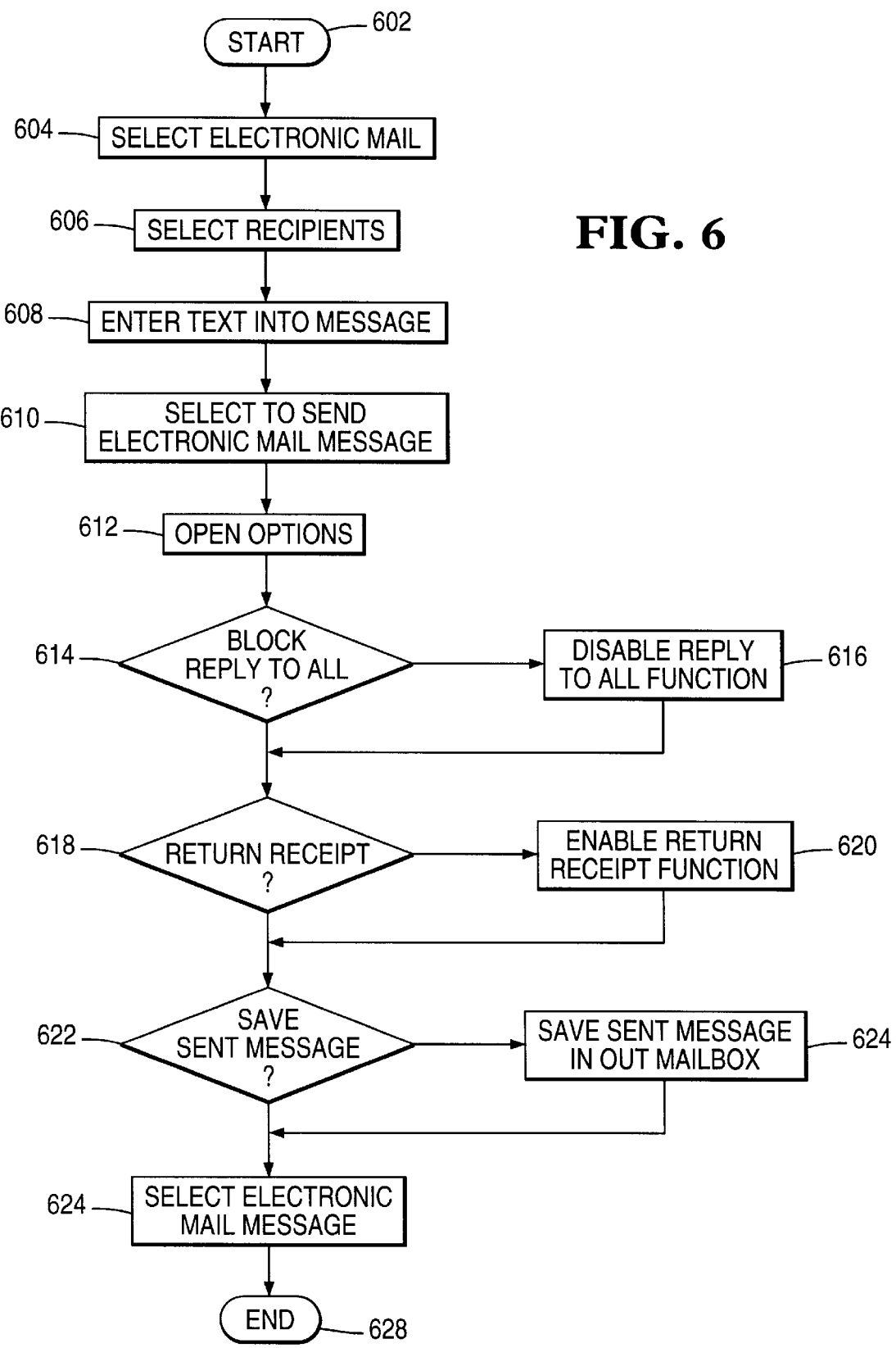
FIG. 6 illustrates a flow chart of the logic performed by the present invention at the sender's system in blocking the "Reply to All" option in an electronic mail system.

FIG. 6 illustrates a flow chart of the logic performed by the present invention at the sender's system in blocking the "Reply to All" option in the exemplary electronic mail system. Block 602 represents the start of the logic in composing a message in the electronic mail system. Block 604 represents the system receiving a command from the user selecting the electronic mail system and opening a mail message window. Block 606 represents the system receiving a command from the user selecting the recipients by entering their electronic mail address or by entering a macro for mailing to a group of recipients. Block 608 represents the system receiving a command from the user entering text into the body of the message. After the message has been composed and the recipients have been selected, block 610 represents the system receiving a command from the user sending the intended recipients a copy of the composed message 610. Once the user has sent the current message, block 612 represents the system displaying the option window. Block 614 is a decision block that represents the system determining whether it received a command from the sender of the message selecting to block the "Reply to All" command button in the received recipient's copy of the current message 614. If so, block 616 represents the system performing those functions necessary to block or disable the "Reply to All" command button in the recipient's copy of the current message. Block 618 is a decision block that represents the system determining whether it received a command from the sender choosing whether to obtain a return receipt for the message. If so, block 620 represents the system performing the functions necessary to enable the receipt notification. Block 622 is a decision block that represents the system determining whether it received a command from the sender saving a copy of the sent message. If so, block 624 represents the system saving the message in the outgoing mailbox of the sender. After the sender has verified the selections above, block 626 represents the system sending the message in response to receiving a command from the, i.e., by selecting the send button. Thereafter, the message is transmitted to all the recipients and includes the selected options within it.

Figure 7:
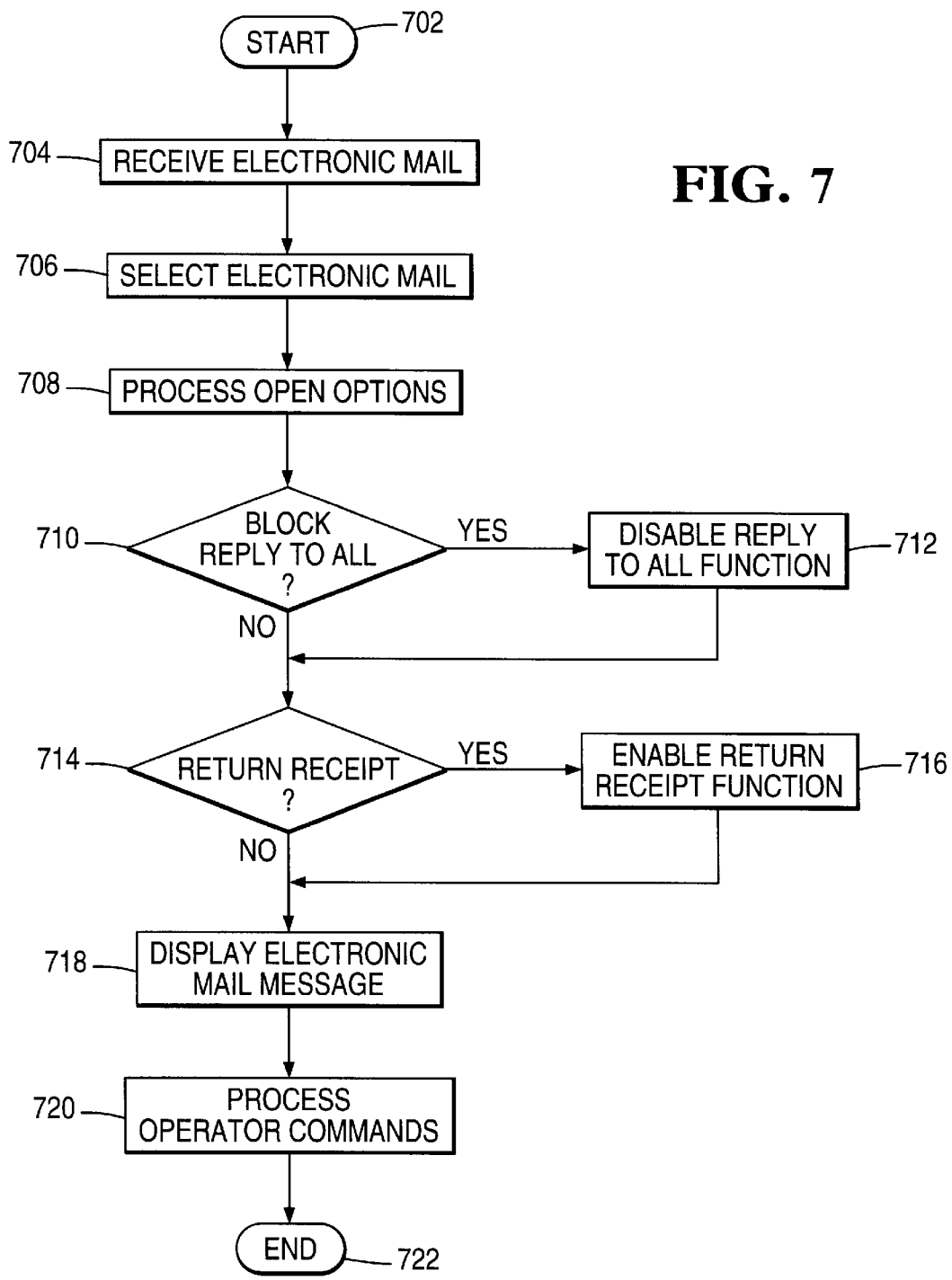
FIG. 7 illustrates a flow chart of the logic performed by the present invention at the recipient's system in blocking the "Reply to All" option in an electronic mail system.

FIG. 7 illustrates a flow chart of the logic performed by the present invention at the recipient's system in blocking the "Reply to All" option in the exemplary electronic mail system. Block 702 represents the start of the logic in receiving a message in the electronic mail system. Block 704 represents the system receiving an electronic mail message in the electronic mail system. Block 706 represents the system receiving a command from the user selecting the electronic mail system and opening a mail message window. Block 708 represents the system processing the open options associated with the electronic mail message. Block 710 is a decision block that represents the system determining whether the electronic mail message included a command from the sender of the message blocking the "Reply to All" command button in the recipient's copy of the message. If so, block 712 represents the system performing those functions necessary to block or disable the "Reply to All" command button in the recipient's copy of the message. Block 714 is a decision block that represents the system determining whether the electronic mail message included a command from the sender of the message a requesting return receipt for the message. If so, block 716 represents the system performing the functions necessary to enable and perform the receipt notification. Block 718 represents the system displaying the electronic mail message for the recipient. Thereafter, block 720 represents the system processing any further commands associated with the message or entered by the user.

Thus, even in situations where a recipient of a message has set the default response to enable the "Reply to All" command, global replies may be prevented. This prevents a barrage of inadvertent mailings that often become a nuisance. Further, the burden of preventing such barrages is more aptly shared by the sender as well.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for operating an electronic mail system, comprising the steps of:

receiving an electronic mail message at a computer operated by a receiver;

displaying the received electronic mail message on a monitor attached to the computer operated by the receiver; and blocking a "Reply to All" command from being executed by the computer operated by the receiver in response to the displayed electronic mail message when an associated blocking option has been selected at a computer operated by a sender of the displayed electronic mail message.

2. The method of claim 1, further comprising the step of displaying a "Reply to All" command on the monitor attached to the computer operated by the receiver.

3. The method of claim 2, wherein the step of displaying the "Reply to All" command further comprises the step of altering the display of the "Reply to All" command on the monitor attached to the computer operated by the receiver to indicate that the "Reply to All" command is blocked.

4. The method of claim 1, further comprising the steps of:
receiving one or more commands to create the electronic mail message at a computer operated by the sender;
receiving one or more commands to enable the associated blocking option at the computer operated by the sender; and
transmitting the electronic mail message from the computer operated by the sender to the computer operated by the receiver, wherein the electronic mail message includes an indication that the blocking option has been selected at computer operated by the sender.

5. An electronic mail system, comprising:
a computer with a monitor attached thereto, wherein the computer is operated by a receiver;
means, performed by the computer operated by the receiver, for receiving an electronic mail message;
means, performed by the computer operated by the receiver, for displaying the electronic mail message on the monitor attached operated by the receiver; and
means, performed by the computer operated by the receiver, for blocking a "Reply to All" command from being executed by the computer operated by the receiver in response to the displayed electronic mail message when an associated blocking option has been selected at a computer operated by a sender of the electronic mail message.

6. The electronic mail system of claim 5, further comprising means for displaying a "Reply to All" command on the monitor attached to the computer operated by the receiver.

7. The electronic mail system of claim 6, wherein the means for displaying the "Reply to All" command further comprises means for altering the display of the "Reply to All" command on the monitor attached to the computer operated by the receiver to indicate that the "Reply to All" command is blocked.

8. The electronic mail system of claim 5, further comprising:
means, performed by the computer operated by the sender, for receiving one or more commands from the sender to create the electronic mail message;
means, performed by the computer operated by the sender, for receiving one or more commands from the sender to enable the associated blocking option; and
means, performed by the computer operated by the sender, for transmitting the electronic mail message from the computer operated by the sender to the computer operated by the receiver, wherein the electronic mail message includes an indication that the blocking option has been enabled.

9. A program storage medium readable by a computer having a memory, the medium tangibly embodying one or more programs of instructions executable by the computer to perform a method for operating an electronic mail system, the method comprising the steps of:
receiving an electronic mail message at a computer operated by a receiver;
displaying the received electronic mail message on a monitor attached to the computer operated by the receiver; and
blocking a "Reply to All" command from being executed by the computer operated by the receiver in response to the displayed electronic mail message when an associated blocking option has been selected at a computer operated by a sender of the displayed electronic mail message.

10. The program storage medium of claim 9, further comprising the step of displaying a "Reply to All" command on the monitor attached to the computer operated by the receiver.

11. The program storage medium of claim 10, wherein the step of displaying the "Reply to All" command further comprises the step of altering the display of the "Reply to All" command on the monitor attached to the computer operated by the receiver to indicate that the "Reply to All" command is blocked.

12. The program storage medium of claim 9, further comprising the steps of:
receiving one or more commands to create the electronic mail message at the computer operated by the sender;
receiving one or more commands to enable the associated blocking option at the computer operated by the sender; and
transmitting the electronic mail message from the computer operated by the sender to the computer operated by the receiver, wherein the electronic mail message includes an indication that the blocking option has been selected by the sender.

13. A method for operating an electronic mail system, comprising the steps of:
receiving one or more commands to create the electronic mail message at a computer operated by a sender;
receiving one or more commands to enable an associated blocking option at the computer operated by the sender; and
transmitting the electronic mail message from the computer operated by the sender to a computer operated by a receiver, wherein the electronic mail message includes an indication that the associated blocking option has been enabled at the computer operated by the sender.

14. The method of claim 13, further comprising the steps of:
displaying the electronic mail message on a monitor attached to the computer operated by the receiver; and
blocking a "Reply to All" command from being executed by the computer operated by the receiver in response to the displayed electronic mail message when then associated blocking option has been enabled at the computer operated by the sender of the displayed electronic mail message.

15. The method of claim 14, further comprising the step of displaying a "Reply to All" command on the monitor attached to the computer operated by the receiver.

16. The method of claim 15, wherein the step of displaying the "Reply to All" command further comprises the step of altering the display of the "Reply to All" command on the monitor attached to the computer operated by the receiver to indicate that the "Reply to All" command is blocked.

17. An electronic mail system, comprising:
a computer with a monitor attached thereto, wherein the computer is operated by a sender;
means, performed by the computer operated by the sender, for receiving one or more commands to create an electronic mail message;

means, performed by the computer operated by the sender, for receiving one or more commands to enable an associated blocking option; and means, performed by the computer operated by the sender, for transmitting the electronic mail message from the computer operated by the sender to a computer operated by a receiver, wherein the electronic mail message includes an indication that the associated blocking option has been enabled at the computer operated by the sender.

18. The electronic mail system of claim 17, further comprising:

means, performed by the computer operated by the sender, for displaying the electronic mail message on a monitor attached thereto; and means, performed by the computer operated by the sender, for blocking a "Reply to All" command from being executed in response to the displayed electronic mail message when then associated blocking option has been enabled.

19. The electronic mail system of claim 18, further comprising means for displaying a "Reply to All" command on the monitor of the computer operated by the receiver.

20. The electronic mail system of claim 19, wherein the means for displaying the "Reply to All" command further comprises means for altering the display of the "Reply to All" command on the monitor attached to the computer operated by the receiver to indicate that the "Reply to All" command is blocked.

21. A program storage medium readable by a computer having a memory, the medium tangibly embodying one or more programs of instructions executable by the computer to perform method steps for operating an electronic mail system, the method comprising the steps of:

receiving one or more commands to create the electronic mail message at a computer operated by a sender;

receiving one or more commands to enable an associated blocking option at the computer operated by the sender; and transmitting the electronic mail message from the first computer operated by the sender to a computer operated by a receiver, wherein the electronic mail message includes an indication that the associated blocking option has been enabled at the computer operated by the sender.

22. The program storage medium of claim 21, further comprising the steps of:

displaying the electronic mail message on a monitor attached to the computer operated by the receiver; and blocking a "Reply to All" command from being executed by the computer operated by the receiver in response to the displayed electronic mail message when then associated blocking option has been enabled at the computer operated by the sender of the displayed electronic mail message.

23. The program storage medium of claim 22, further comprising the step of displaying a "Reply to All" command on the monitor attached to the computer operated by the receiver.

24. The program storage medium of claim 23, wherein the step of displaying the "Reply to All" command further comprises the step of altering the display of the "Reply to All" command on the monitor attached to the computer operated by the receiver to indicate that the "Reply to All" command is blocked.

* * * * *